(12) United States Patent
Xiao et al.

(10) Patent No.: US 10,615,461 B2
(45) Date of Patent: Apr. 7, 2020

(54) LITHIUM ION BATTERY INCLUDING LITHIUM ION-EXCHANGED ZEOLITE PARTICLES

(71) Applicant: GM Global Technology Operations LLC, Detroit, MI (US)

(72) Inventors: Xingcheng Xiao, Troy, MI (US); Sherman H. Zeng, Troy, MI (US); Mei Cai, Bloomfield Hills, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 310 days.

(21) Appl. No.: 15/447,355

(22) Filed: Mar. 2, 2017

(65) Prior Publication Data

US 2018/0254531 A1 Sep. 6, 2018

(51) Int. Cl.
*H01M 10/42* (2006.01)
*H01M 10/0565* (2010.01)
(Continued)

(52) U.S. Cl.
CPC ..... *H01M 10/4235* (2013.01); *H01M 2/1646* (2013.01); *H01M 2/1653* (2013.01);
(Continued)

(58) Field of Classification Search
CPC ......... H01M 10/4235; H01M 10/0565; H01M 10/0567; H01M 10/0568
See application file for complete search history.

(56) References Cited

U.S. PATENT DOCUMENTS

| 5,728,489 A * | 3/1998 | Gao | H01M 10/052 |
| | | | 429/309 |
| 6,632,565 B2 * | 10/2003 | Nemoto | H01M 4/62 |
| | | | 429/199 |

(Continued)

FOREIGN PATENT DOCUMENTS

CN 103887473 A * 6/2014
KR -20160075376 A * 6/2016

OTHER PUBLICATIONS

Machine Translation of KR 20160075376.*
J. Vetter et al., Ageing mechanisms in lithium-ion batteries, J. Power Sources, Mar. 14, 2005, pp. 269-281, vol. 147, Elsevier B. V.

*Primary Examiner* — Jonathan G Jelsma
(74) *Attorney, Agent, or Firm* — Reising Ethington P.C.

(57) ABSTRACT

An electrochemical cell of a secondary lithium ion battery includes lithium ion-exchanged zeolite particles or "lithiated zeolite particles" positioned along at least a portion of a lithium ion transport path through the electrochemical cell. The lithiated zeolite particles may be positioned within the lithium ion transport path through the electrochemical cell, for example, by being distributed throughout an electrolyte disposed between confronting anterior surfaces of a negative electrode and a positive electrode. Additionally or alternatively, the lithiated zeolite particles may be positioned within the lithium ion transport path through the electrochemical cell by being distributed throughout or deposited as a coating layer on the negative electrode, the positive electrode, and/or a porous separator sandwiched between the confronting anterior surfaces of the negative and positive electrodes.

14 Claims, 5 Drawing Sheets

(51) Int. Cl.
*H01M 10/0567* (2010.01)
*H01M 10/0568* (2010.01)
*H01M 2/16* (2006.01)
*H01M 10/056* (2010.01)
*H01M 4/36* (2006.01)
*H01M 10/0525* (2010.01)
*H01M 10/0569* (2010.01)

(52) U.S. Cl.
CPC ......... *H01M 2/1686* (2013.01); *H01M 4/366* (2013.01); *H01M 10/056* (2013.01); *H01M 10/0525* (2013.01); *H01M 10/0565* (2013.01); *H01M 10/0567* (2013.01); *H01M 10/0568* (2013.01); *H01M 10/0569* (2013.01); *H01M 2300/0028* (2013.01); *H01M 2300/0085* (2013.01)

(56) References Cited

U.S. PATENT DOCUMENTS

| | | | |
|---|---|---|---|
| 7,771,496 B1* | 8/2010 | Nakahara | H01M 10/052 29/623.1 |
| 2006/0068296 A1* | 3/2006 | Nakagawa | H01M 4/133 429/324 |
| 2010/0112095 A1* | 5/2010 | Morris | A61K 8/19 424/718 |
| 2012/0141868 A1* | 6/2012 | Hirano | B01D 15/00 429/188 |
| 2015/0044537 A1* | 2/2015 | Dong | H01M 8/0245 429/107 |
| 2017/0222263 A1* | 8/2017 | Sakurai | H01M 4/13 |
| 2019/0198926 A1* | 6/2019 | Kaneko | H01M 10/0567 |

* cited by examiner

LITHIUM ION BATTERY INCLUDING LITHIUM ION-EXCHANGED ZEOLITE PARTICLES

TECHNICAL FIELD

The present disclosure relates generally to lithium ion batteries and, more specifically, to lithium ion battery materials.

BACKGROUND

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium ion batteries generally include one or more electrochemical cells having a negative electrode, a positive electrode, and an electrolyte for conducting lithium ions between the negative and positive electrodes. A porous separator wetted with a liquid electrolyte solution may be sandwiched between the electrodes to physically separate and electrically insulate the electrodes from each other while permitting free ion flow. Each of the negative and positive electrodes is typically carried on or connected to a metallic current collector. The current collectors may be connected to each other by an interruptible external circuit through which electrons can pass from one electrode to the other while lithium ions migrate in the opposite direction through the electrochemical cell during charging and discharge of the battery.

The positive electrode in a lithium ion battery typically comprises a lithium-based intercalation host material that can undergo the reversible insertion or intercalation of lithium ions. The negative electrode typically comprises an intercalation host material that can undergo the reversible insertion or intercalation of lithium ions at a lower electrochemical potential than the material of the positive electrode such that an electrochemical potential difference exists between the electrodes. The electrolyte comprises a material suitable for conducting lithium ions and may be in solid or liquid form. A suitable non-aqueous liquid electrolyte may comprise a solution including a lithium salt dissolved or ionized in an organic solvent or a mixture of organic solvents.

Lithium ion batteries can reversibly supply power to an associated load device on demand. More specifically, electrical power can be supplied to a load device by a lithium ion battery until the lithium content of the negative electrode is effectively depleted. The battery may then be recharged by passing a suitable direct electrical current in the opposite direction between the electrodes.

During discharge, the negative electrode contains a relatively high concentration of intercalated lithium, which is oxidized into lithium ions and electrons. The lithium ions travel from the negative electrode (anode) to the positive electrode (cathode) through the electrolyte. At the same time, the electrons pass through the external circuit from the negative electrode to the positive electrode. The lithium ions are assimilated into the material of the positive electrode by an electrochemical reduction reaction. The battery may be recharged after a partial or full discharge of its available capacity by an external power source, which reverses the electrochemical reactions that transpired during discharge.

During re-charge, intercalated lithium in the positive electrode is oxidized into lithium ions and electrons. The lithium ions travel from the positive electrode to the negative electrode via the electrolyte, and the electrons pass through the external circuit to the negative electrode. The lithium cations are reduced to elemental lithium at the negative electrode and stored in the material of the negative electrode for reuse.

SUMMARY

An electrochemical cell for a lithium ion battery may comprise a negative electrode, a positive electrode spaced apart from the negative electrode, and an electrolyte infiltrating the negative electrode and the positive electrode and disposed between confronting anterior surfaces of the negative electrode and the positive electrode. A lithium ion transport path may extend through the negative electrode, the positive electrode, and the electrolyte. Lithiated zeolite particles may be positioned along at least a portion of the lithium ion transport path. A plurality of electrochemical cells may be connected in a series or parallel arrangement to form a lithium ion battery.

The electrolyte may comprise a liquid electrolyte solution including a lithium salt dissolved in a nonaqueous, aprotic organic solvent, and the lithiated zeolite particles may be suspended in or mixed with the liquid electrolyte solution.

The electrolyte may comprise a gel polymer electrolyte and the lithiated zeolite particles may be distributed throughout the gel polymer electrolyte.

A porous separator may be disposed between the confronting anterior surfaces of the negative electrode and the positive electrode and infiltrated with the electrolyte.

The lithiated zeolite particles may be distributed throughout the porous separator.

The lithiated zeolite particles may be coated on a first side of the porous separator that faces toward the negative electrode, on an opposite second side of the porous separator that faces toward the positive electrode, or on both the first and second sides of the porous separator.

The separator may comprise a first layer and a second layer adjacent the first layer, and the lithiated zeolite particles may be distributed along an interface between the first and second layers of the separator.

The lithiated zeolite particles may be distributed throughout the negative electrode, the positive electrode, or both the negative and positive electrodes.

The lithiated zeolite particles may be coated on the anterior surface of the negative electrode, on the anterior surface of the positive electrode, or on both the anterior surfaces of the negative and positive electrodes.

The electrochemical cell may include a negative electrode current collector adjacent the negative electrode and a positive electrode current collector adjacent the positive electrode.

Lithiated zeolite particles may be disposed on a surface of the negative electrode current collector or the positive electrode current collector, or on surfaces of both the negative and positive electrode current collectors.

The lithiated zeolite particles may comprise particles of a dehydrated zeolite material exhibiting an Si:Al ratio in the range of 1:1 to 2:1 and having a framework type selected from the group consisting of: ABW, AFG, ANA, BIK, CAN, EDI, FAU, FRA, GIS, GME, JBW, LAU, LEV, LIO, LOS, LTA, LTN, NAT, PAR, PHI, ROG, SOD, WEN, THO, and TSC.

The lithiated zeolite particles may comprise particles of a dehydrated zeolite material exhibiting an Si:Al ratio in the range of 2:1 to 5:1 and having a framework type selected from the group consisting of: BHP, BOG, BRE, CAS, CHA, CHI, DAC, EAB, EMT, EPI, ERI, FAU, FER, GOO, HEU, KFI, LOV, LTA, LTL, MAZ, MEI, MER, MON, MOR, OFF, PAU, RHO, SOD, STI, and YUG.

The lithiated zeolite particles may comprise particles of a dehydrated zeolite material exhibiting an Si:Al ratio of greater than 5:1 and having a framework type selected from the group consisting of: ASV, BEA, CFI, CON, DDR, DOH, DON, ESV, EUO, FER, GON, IFR, ISV, ITE, LEV, MEL, MEP, MFI, MFS, MSO, MTF, MTN, MTT, MTW, MWW, NON, NES, RSN, RTE, RTH, RUT, SFE, SFF, SGT, SOD, STF, STT, TER, TON, VET, VNI, and VSV.

An electrochemical cell of a secondary lithium ion battery may be manufactured by a multistep process. A microporous zeolite material may be provided in powder form and may have exchangeable extra-framework cations. The microporous zeolite material may be contacted with a solution comprising a lithium salt and a solvent. Contact between the zeolite material and the solution may be performed at a sufficient temperature and for a sufficient duration for at least some of the exchangeable extra-framework cations in the zeolite material to be replaced with lithium ions to produce a lithiated zeolite material. The lithiated zeolite material may be heated at a temperature greater than 100° C. for a sufficient duration to remove adsorbed water therefrom to produce a dehydrated lithiated zeolite material. Particles of the dehydrated lithiated zeolite material may be incorporated into one or more components of an electrochemical cell for a lithium ion battery. The dehydrated lithiated zeolite particles may be incorporated into one or more components of an electrochemical cell for a lithium ion battery such that the particles are positioned along at least a portion of a lithium ion transport path through the electrochemical cell.

The dehydrated lithiated zeolite particles may be stored in a dry environment prior to incorporating the particles into an electrochemical cell for a lithium ion battery.

The dehydrated lithiated zeolite particles may be re-heating at a temperature greater than 100° C. for a sufficient duration to remove trace water therefrom prior to incorporating the particles in an electrochemical cell for a lithium ion battery

DETAILED DESCRIPTION

Particles of a lithiated zeolite material may be incorporated into one or more components of an electrochemical cell of a lithium ion battery to prevent or mitigate degradation of various battery components during battery operation and to improve the life and cycle performance of the battery. As used herein, the term "lithiated zeolite" means a zeolite that has been ion-exchanged with lithium ions such that a plurality of lithium ions are present within the zeolite as free ions and/or as extra-framework ions.

Figure 1:
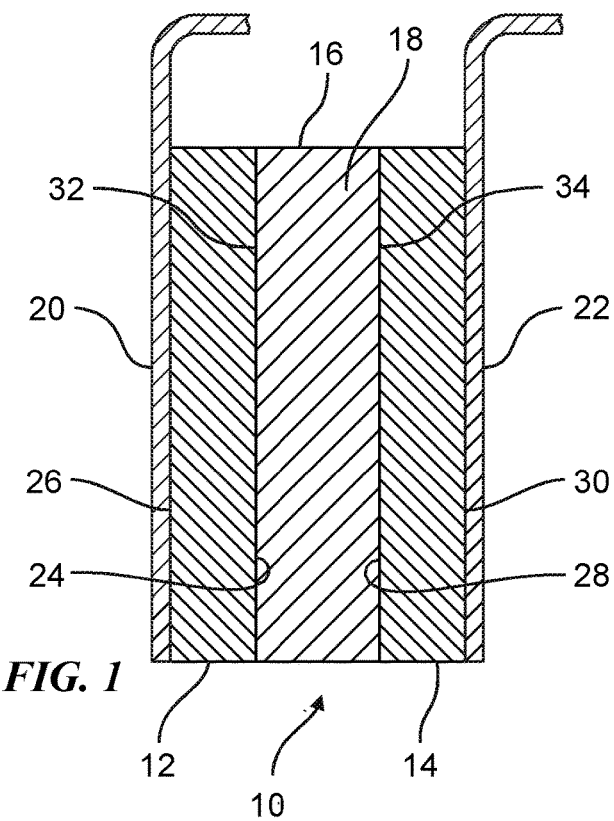
FIG. 1 is a cross-sectional view of an electrochemical cell of a lithium ion battery along with its associated metallic current collectors according to one aspect of the disclosure.

FIG. 1 illustrates in idealized fashion an electrochemical cell 10 of a lithium ion battery (not shown) that includes particles of a lithiated zeolite material disposed within a lithium ion transport path through the electrochemical cell 10. The electrochemical cell 10 comprises a negative electrode 12, a positive electrode 14, a porous separator 16, and an electrolyte 18, which impregnates, infiltrates, or wets each of the negative electrode 12, the positive electrode 14, and the porous separator 16. A negative electrode current collector 20 is positioned adjacent the negative electrode 12, and a positive electrode current collector 22 is positioned adjacent the positive electrode 14.

The negative electrode 12 includes an anterior surface 24 and an opposite posterior surface 26 relative to the location of the separator 16. The positive electrode 14 is spaced-apart from the negative electrode 12 and similarly includes an anterior surface 28 and an opposite posterior surface 30. In assembly, the anterior surfaces 24, 28 of the negative and positive electrodes 12, 14 confront one another, with the separator 16 sandwiched between the confronting anterior surfaces 24, 28 of the negative and positive electrodes 12, 14. In particular, the separator 16 includes a first side 32 that faces toward the negative electrode 12 and an opposite second side 34 that faces toward the positive electrode 14. The negative electrode current collector 20 interfaces with or engages the posterior surface 26 of the negative electrode 12 and the positive electrode current collector 22 interfaces with or engages the posterior surface 30 of the positive electrode 14.

The electrochemical cell 10 may have a thickness, measured from an outer surface of the negative electrode current collector 20 to an opposite outer surface of the positive electrode current collector 22 of less than 100 micrometers to about one millimeter. Individually, the current collectors 20, 22 may have thicknesses of about 20 micrometers, the electrodes 12, 14 may have thicknesses of up to 200 micrometers, and the separator may have a thickness of about 25 micrometers.

The negative electrode 12 may comprise any material that can undergo the reversible insertion or intercalation of lithium ions at a lower electrochemical potential than the material of the positive electrode 14 such that an electrochemical potential difference exists between the electrodes 12, 14. The material of the negative electrode 12 may be generally described as an intercalation host material. Some examples of suitable intercalation host materials for the negative electrode 12 include carbon-based materials, such as graphite, silicon, a silicon-based alloy or composite material, tin, aluminum, indium, zinc, germanium, silicon oxide, titanium oxide, and lithium titanate. The intercalation host material of the negative electrode 12 may be intermingled with a polymeric binder to provide the negative electrode 12 with structural integrity. Some examples of suitable polymeric binders include polyvinyldiene fluoride (PVdF), ethylene propylene diene monomer (EPDM) rubber, styrene butadiene rubber (SBR), carboxymethoxy cellulose (CMC), polyacrylic acid, and mixtures thereof. The negative electrode 12 optionally may include particles of an electrically conductive material, which may comprise very fine particles of, for example, high-surface area carbon black.

The positive electrode 14 may comprise any material that can undergo the reversible insertion or intercalation of lithium ions. In one form, the positive electrode 14 comprises a lithium-based intercalation host material having a higher electrochemical potential than the intercalation host material of the negative electrode 12. The intercalation host material of the positive electrode 14 suitably may comprise a layered oxide represented by the formula $LiMeO_2$, an olivine-type oxide represented by the formula $LiMePO_4$, or a spinel-type oxide represented by the formula $LiMe_2O_4$, where Me is a transition metal. Some examples of suitable transition metals for the metal oxide of the intercalation host material of the positive electrode 14 include Co, Ni, Mn, Fe, P, Al, V, and combinations thereof. More specifically, the lithium-based intercalation host material may comprise a layered lithium transition metal oxide, such as lithium cobalt oxide ($LiCoO_2$) and lithium-nickel-magnesium-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), or lithium fluorophosphate ($Li_2FePO_4F$), lithium nickel oxide ($LiNiO_2$), lithium aluminum manganese oxide ($Li_xAl_yMn_{1-y}O_2$), lithium vanadium oxide ($LiV_2O_5$), or a combination thereof The same polymeric binder materials (PVdF, EPDM, SBR, CMC, polyacrylic acid) and electrically conductive particles (high-surface area carbon black) used in the negative electrode 12 also may be intermingled with the lithium-based intercalation host material of the positive electrode 14 for the same purposes.

The porous separator 16 may comprise any material that can physically separate and electrically insulate the electrodes 12, 14 from each other while permitting the free flow of lithium ions therebetween. For example, the porous separator 16 may comprise a non-woven material or a microporous polymeric material. In particular, the porous separator 16 may comprise a single polyolefin or a combination of polyolefins, such as polyethylene (PE), polypropylene (PP), polyamide (PA), poly(tetrafluoroethylene) (PTFE), polyvinylidine fluoride (PVdF), and/or poly(vinyl chloride) (PVC). In one form, the porous separator 16 may comprise a laminate of one or more polymeric materials, such as a laminate of PE and PP.

The electrolyte 18 may comprise any material that is capable of effectively conducting lithium ions through the separator 16 and between the negative and positive electrodes 12, 14. For example, the electrolyte 18 may comprise a non-aqueous liquid electrolyte. In such case, the electrolyte 18 may comprise a solution including a lithium salt dissolved or ionized in a nonaqueous, aprotic organic solvent or a mixture of nonaqueous, aprotic organic solvents. Some suitable lithium salts that may be used to make the electrolyte 18 include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and mixtures thereof. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture thereof. As another example, the electrolyte 18 may comprise a gel or plasticized polymer electrolyte. In such case, the electrolyte 18 may comprise a polymer host material soaked with a liquid electrolyte solution. Some examples of suitable polymer host materials include poly(vinylidene) (PVdF), poly(acrylonitrile) (PAN), poly(methyl methacrylate) (PMMA), poly(ethylene oxide) (PEO), polyacrylates, and poly(vinylidene fluoride-hexafluoropropylene) (PVdF-HFP).

The negative and positive electrode current collectors 20, 22 respectively associated with the negative and positive electrodes 12, 14 may comprise any metallic material capable of collecting and reversibly passing free electrons to and from their respective electrodes 12, 14. For example, the negative and positive electrode current collectors 20, 22 may comprise thin and flexible metallic foils. In one form, the negative electrode current collector 20 may comprise a copper foil and the positive electrode current collector 22 may comprise an aluminum foil. Other types of metal foils or metallic materials may of course be used, if desired.

The lithiated zeolite particles may be incorporated into the electrochemical cell 10 by being positioned within a lithium ion transport path through the electrochemical cell 10. The lithium ion transport path may extend through the negative electrode 12, the separator 16, the positive electrode 14, and the electrolyte 18, between the posterior surface 26 of the negative electrode 12 and the posterior surface 30 of the positive electrode 14. During normal operation, lithium ions are communicated back and forth between the negative electrode 12 and the positive electrode 14 of the electrochemical cell 10, and the lithiated zeolite particles may be positioned such that, during this back and forth movement, the lithium ions will necessarily encounter one or more lithiated zeolite particles. The lithium ions may come into contact with or travel around or through the lithiated zeolite particles during their movement through the electrochemical cell 10. The lithiated zeolite particles are formulated to trap or inhibit the movement of certain substances within the electrochemical cell 10, without adversely affecting the transport or net flow of lithium ions through the electrochemical cell 10. For example, the lithiated zeolite particles may be formulated to trap or inhibit the movement of water molecules, hydrogen ions, hydrofluoric acid (HF), and transition metal ions, such as $Mn^{2+}$ and $Fe^{2+/3+}$ ions, within the electrochemical cell 10.

Further details regarding the lithium ion transport path through an electrochemical cell 10 of a lithium ion battery are set forth below. The following description is specifically directed to an electrochemical cell 10 that includes $LiMn_2O_4$ having a spinel crystalline structure as the lithium-based intercalation host material of the positive electrode 14 and graphite as the intercalation host material of the negative electrode 12. However, ordinarily skilled artisans will readily understand that this description is generally applicable to a variety of secondary lithium ion batteries having negative and positive electrodes 12, 14 with different material compositions.

When the electrochemical cell 10 is in a discharged state, the positive electrode 14 contains a relatively high concentration of intercalated lithium. In one form, when the lithium-based intercalation host material of the positive electrode 14 comprises spinal $LiMn_2O_4$, guest or free lithium ions ($Li^+$) occupy interstitial spaces defined by the $Mn_2O_4$ polyhedral frameworks within the three-dimensional framework of the lithium-based intercalation host material. Charging of the electrochemical cell 10 involves the conversion of electrical energy into chemical energy, which is stored in the intercalation host material of the positive electrode 14. An electric current is applied to the electrochemical cell 10 to initiate the charging process. During the charging process, the intercalation host material of the positive electrode 14 is oxidized, which results in the de-intercalation of $Li^+$ ions from the intercalation host material of the positive electrode 14 according to the following reversible electrochemical reaction:

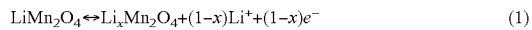

$$LiMn_2O_4 \leftrightarrow Li_xMn_2O_4 + (1-x)Li^+ + (1-x)e^- \qquad (1)$$

At the same time, an electron is released and the $Mn^{3+}$ is oxidized to $Mn^{4+}$. The released $Li^+$ ions travel through the interstitial spaces in the three-dimensional framework of the lithium-based intercalation host material toward the anterior surface 28 of positive electrode 14. The negatively charged electrons ($e^-$) travel in the opposite direction toward the posterior surface 30 of the positive electrode 14, through the positive electrode current collector 22, and through an external circuit (not shown). Prior to or upon reaching the anterior surface 28 of the positive electrode 14, the $Li^+$ ions dissolve in or otherwise enter the electrolyte 18 and diffuse through the electrolyte 18 and the separator 16, from the positive electrode 14 to the negative electrode 12, thereby maintaining charge balance within the electrochemical cell 10. The negatively charged electrons ($e^-$) are accepted from the external circuit at the posterior surface 26 of the negative electrode 12, reunited with the $Li^+$ ions in the negative electrode 12, and intercalated between the graphite layers or lattice planes of the intercalation host material of the negative electrode 12 by the following reversible electrochemical reaction:

$$C_6 + xLi^+ + xe^- \leftrightarrow Li_xC_6 \qquad (2)$$

When the electrochemical cell 10 is charged, the negative electrode 12 contains a relatively high concentration of intercalated lithium between the graphite layers or lattice planes of the intercalation host material of the negative electrode 12. Upon discharge, this stored chemical energy is converted to electrical energy, which can be supplied to a load device (not shown). More specifically, upon discharge, the intercalated lithium is oxidized according to the reversible electrochemical reaction (2) set forth above, thereby liberating $Li^+$ ions and negatively charged electrons ($e^-$). The released $Li^+$ ions travel through the intercalation host material of the negative electrode 12 and toward the anterior surface 24 of negative electrode 12. At the same time, the negatively charged electrons ($e^-$) travel in the opposite direction toward the posterior surface 26 of the negative electrode 12, through the negative electrode current collector 20, and back through the external circuit (not shown). Prior to or upon reaching the negative electrode 12, the $Li^+$ ions dissolve in the electrolyte 18 and diffuse through the electrolyte 18 and the separator 16, from the anterior surface 24 of the negative electrode 12 to the anterior surface 28 of the positive electrode 14, thereby maintaining charge balance within the electrochemical cell 10. The negatively charged electrons ($e^-$) are accepted from the external circuit at the posterior surface 30 of the positive electrode 14, reunited with the $Li^+$ ions in the positive electrode 14, and intercalated within the framework of the lithium-based intercalation host material of the positive electrode 14 according to the reversible electrochemical reaction (1) set forth above.

The lithiated zeolite particles may be positioned within a lithium ion transport path through the electrochemical cell 10 by being incorporated into the material compositions of the negative electrode 12, the positive electrode 14, the separator 16, and/or the electrolyte 18, or by being incorporated into any intervening structures within the electrochemical cell 10.

Referring now to FIG. 1, the lithiated zeolite particles may be incorporated into the electrolyte 18 that infiltrates the negative electrode 12, the positive electrode 14, and the porous separator 16. For example, where the electrolyte 18 comprises a liquid electrolyte solution, the lithiated zeolite particles may be dispersed or suspended in the electrolyte 18 or simply mixed with the electrolyte 18 prior to or after assembly of the remaining components of the electrochemical cell 10. Where the electrolyte 18 comprises a gel polymer electrolyte, the lithiated zeolite particles may be used as a filler material and mixed with the precursor materials used to make the polymer host material, or the lithiated zeolite particles may be suspended or mixed with the liquid electrolyte solution that impregnates the polymer host material during manufacture of the gel polymer electrolyte. The lithiated zeolite particles may be present in the electrolyte 18 in an amount constituting 1-10 wt % of the electrolyte 18. For example, the amount of lithiated zeolite particles in the electrolyte 18, as a percentage of the total weight of the electrolyte 18, may be: greater than or equal to 0.0 wt %, 2.0 wt %, or 4.0 wt %; less than or equal to 10.0 wt %, 8.0 wt %, or 6.0 wt %; or between 0.0-10.0 wt %, 2.0-8.0 wt %, or 4.0-6.0 wt %. In one form, the lithiated zeolite particles may be present in the electrolyte 18 in an amount constituting 3-7 wt % of the electrolyte 18. In one specific example, the lithiated zeolite particles may comprise about 5 wt % of the electrolyte 18.

Figure 2:
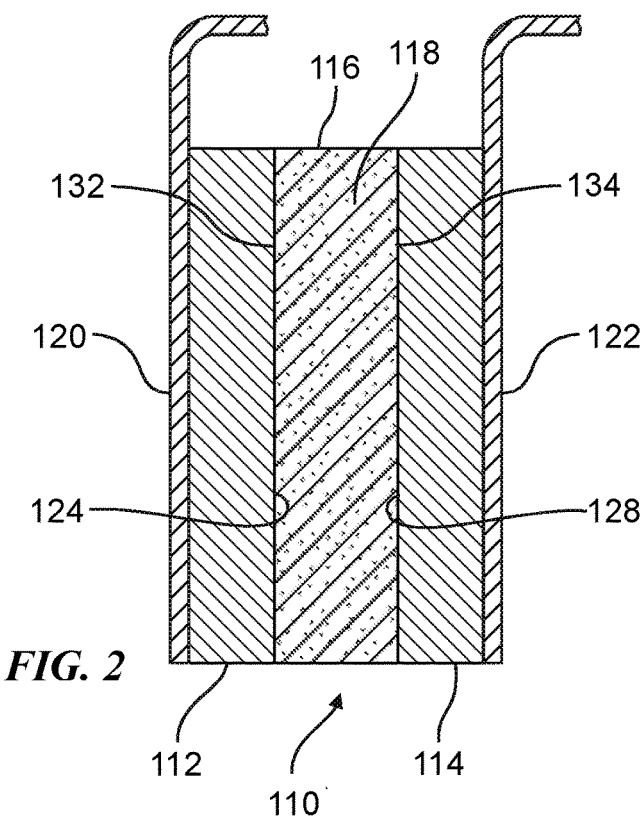
FIG. 2 is a cross-sectional view of an electrochemical cell of a lithium ion battery along with its associated metallic current collectors according to another aspect of the disclosure.
Figure 3:
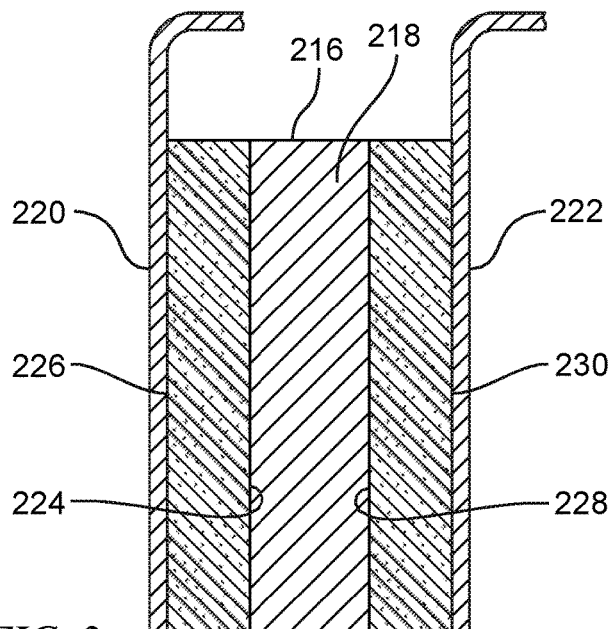
FIG. 3 is a cross-sectional view of an electrochemical cell of a lithium ion battery along with its associated metallic current collectors according to yet another aspect of the disclosure.
Figure 4:
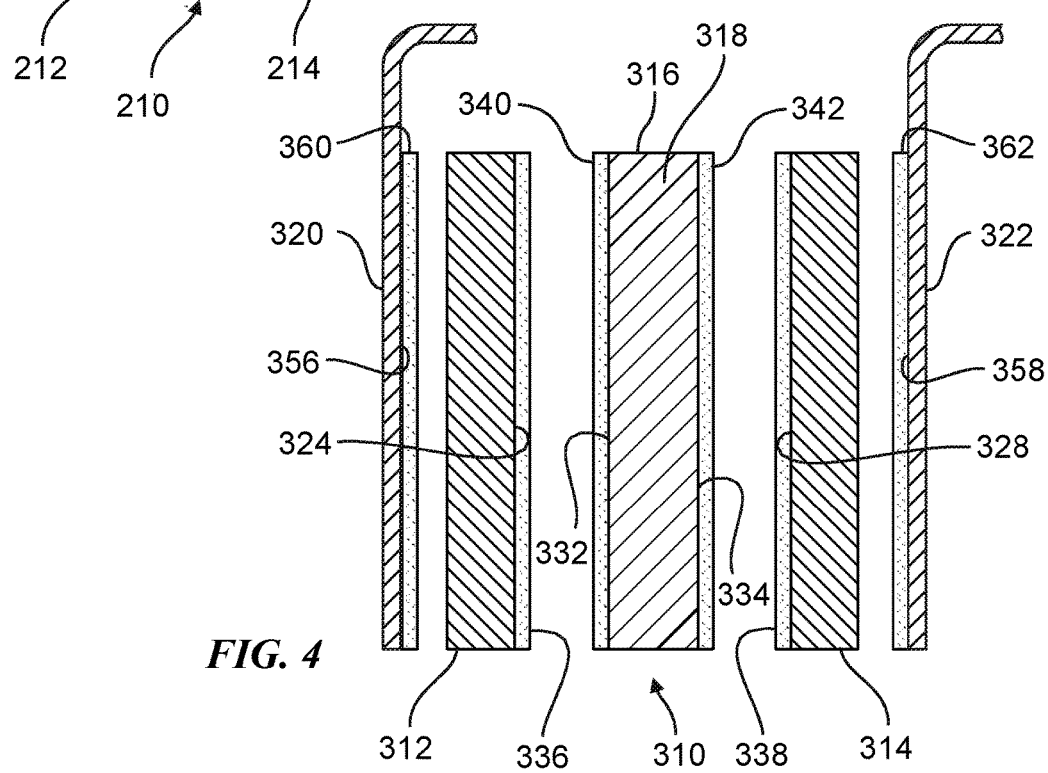
FIG. 4 is an exploded cross-sectional view of a electrochemical cell of a lithium ion battery along with its associated metallic current collectors according to one or more aspects of the disclosure.

FIGS. 2-4 illustrate additional exemplary embodiments of a lithiated zeolite particle-containing electrochemical cell of a lithium ion battery. These exemplary embodiments are similar in many respects to the exemplary embodiment illustrated in FIG. 1, and like numerals among the embodiments generally designate like or corresponding elements throughout the several views of the drawing figures. Accordingly, the descriptions of the exemplary embodiments are incorporated into one another, and description of subject matter common to the exemplary embodiments generally may not be repeated here. In addition, the features of the various exemplary embodiments illustrated in FIGS. 1-4 are not mutually exclusive and may exist in various combinations and permutations without departing from the spirit and scope of the disclosure, even if such combinations and permutations are not expressly described herein.

FIG. 2 illustrates another exemplary embodiment of an electrochemical cell 110 of a lithium ion battery (not shown) that includes particles of a lithiated zeolite material disposed within a lithium ion transport path through the electrochemical cell 110. Like the electrochemical cell 10 illustrated in FIG. 1, the electrochemical cell 110 illustrated in FIG. 2 comprises a negative electrode 112, a positive electrode 114, a porous separator 116, an electrolyte 118, a negative electrode current collector 120, and a positive electrode current collector 122. The separator 116 is sandwiched between confronting anterior surfaces 124, 128 of the negative and positive electrodes 112, 114 and includes a first side 132 that faces toward the negative electrode 112 and an opposite second side 134 that faces toward the positive electrode 114.

In the exemplary embodiment illustrated in FIG. 2, lithiated zeolite particles are disposed within a lithium ion transport path through the electrochemical cell 110 by incorporating the lithiated zeolite particles in the porous separator 116. The lithiated zeolite particles may be uniformly dispersed throughout the entire separator 116 or the particles may be dispersed within a portion of the separator 116. The lithiated zeolite particles may be incorporated into the porous separator 116 by any suitable method, which may be performed during or after the separator 116 is made. For example, the lithiated zeolite particles may be used as a filler material and mixed with the precursor materials used in the separator manufacturing process. In such case, the lithiated zeolite particles may become embedded in the material of the separator 116 during formation thereof. Or the lithiated zeolite particles may be disposed within or impregnated into the pores of the separator 16 after formation thereof. In one form, the lithiated zeolite particles may be mixed with a polyolefin resin prior to extrusion. In another form, the separator 116 may have a layered structure and the lithiated zeolite particles may be incorporated in the porous separator 116 by being distributed along an interface between adjacent layers of the separator 116. For example, layers of a nonwoven material or a microporous polymeric material may be laminated together such that particles of the lithiated zeolite particles are positioned between confronting surfaces of the layers.

The lithiated zeolite particles may be present in the porous separator 116 in an amount constituting 5-50 vol % of the separator 116. For example, the amount of lithiated zeolite particles in the porous separator 116, as a percentage of the total volume of the porous separator 116, may be: greater than or equal to 5.0 vol %, 10.0 vol %, or 20.0 vol %; less than or equal to 50.0 vol %, 40.0 vol %, or 30.0 vol %; or between 5.0-50.0 vol %, 10.0-40.0 vol %, or 20.0-30.0 vol %. In one specific example, the lithiated zeolite particles may comprise about 25 vol % of the separator 116.

FIG. 3 illustrates another exemplary embodiment of an electrochemical cell 210 of a lithium ion battery (not shown) that includes particles of a lithiated zeolite material disposed within a lithium ion transport path through the electrochemical cell 210. The electrochemical cell 210 comprises a negative electrode 212, a positive electrode 214, a porous separator 216, an electrolyte 218, a negative electrode current collector 220, and a positive electrode current collector 222. The negative electrode 212 includes an anterior surface 224 and an opposite posterior surface 226 relative to the location of the separator 216. The positive electrode 214 similarly includes an anterior surface 228 and an opposite posterior surface 230. In assembly, the anterior surfaces 224, 228 of the negative and positive electrodes 212, 214 confront one another, with the separator 216 sandwiched therebetween.

In the exemplary embodiment illustrated in FIG. 3, lithiated zeolite particles are disposed within a lithium ion transport path through the electrochemical cell 210 by incorporating the lithiated zeolite particles in the negative electrode 212 and/or the positive electrode 214. The lithiated zeolite particles may be incorporated into the negative electrode 212 and/or the positive electrode 214 by any suitable method, which may be performed during or after the electrodes 212, 214 are made. The lithiated zeolite particles may be uniformly dispersed throughout the entire negative electrode 212 and/or the entire positive electrode 214, or the particles may be dispersed within a portion of the negative electrode 212 and/or the positive electrode 214. For example, the lithiated zeolite particles may be mixed with the intercalation host material of the negative electrode 212 and/or the positive electrode 214, a polymeric binder, and optionally particles of an electrically conductive material to form a slurry. The lithiated zeolite particle-containing slurry may be spread or cast onto a surface of the negative electrode current collector 220 or the positive electrode current collector 222 prior to assembly of the remaining components of the electrochemical cell 210, as will be understood by those of ordinary skill in the art. The lithiated zeolite particles may be present in the negative electrode 212 and/or the positive electrode 214 in an amount constituting 1-20 wt % of either of the electrodes 212, 214. In one form, the lithiated zeolite particles may comprise 1-10 wt % of the negative electrode 212 and/or the positive electrode 214. In one specific example, the lithiated zeolite particles may comprise about 5 wt % of the negative electrode 212 and/or the positive electrode 214.

FIG. 4 illustrates yet another exemplary embodiment of an electrochemical cell 310 of a lithium ion battery (not shown) that includes particles of a lithiated zeolite material disposed within a lithium ion transport path through the electrochemical cell 310. The electrochemical cell 310 comprises a negative electrode 312, a positive electrode 314, a porous separator 316, an electrolyte 318, a negative electrode current collector 320, and a positive electrode current collector 322. In assembly, the separator 316 is sandwiched between confronting anterior surfaces 324, 328 of the negative and positive electrodes 312, 314 and includes a first side 332 that faces toward the negative electrode 312 and an opposite second side 334 that faces toward the positive electrode 314.

In the exemplary embodiment illustrated in FIG. 4, lithiated zeolite particles are disposed within a lithium ion transport path through the electrochemical cell 110 by coating or depositing the lithiated zeolite particles on the anterior surface 324 of the negative electrode 312, the anterior surface 328 of the positive electrode 314, the first side 332 of the separator 316, and/or the second side 334 of the separator 316. For example, the lithiated zeolite particles may be coated or deposited on the anterior surface 324 of the negative electrode 312 to form a coating layer 336, on the anterior surface 328 of the positive electrode 314 to form a coating layer 338, on the first side 332 of the separator 316 to form a coating layer 340, and/or on the second side 334 of the separator 316 to form a coating layer 342. The coating layers 336, 338, 340, 342 may be formed such that they cover the entire surface area or only a portion of the surface area of any of the surfaces 324, 328 and/or sides 332, 334. The coating layers 336, 338, 340, 342 may have thicknesses of less than 5 μm. As compared to the thickness of the separator 316, the thickness of either of the coatings layers 340, 342 may be less than that of the separator 316. More specifically, the thickness of either of the coatings layers 340, 342 may be 50% or less than the thickness of the separator 316. The thickness of either of the coatings layers 336, 338 may be less than the thickness of either the negative electrode 312 and/or the positive electrode 314.

In one form, lithiated zeolite particles may be coated or deposited on a surface, such as an inner surface 356, of the negative electrode current collector 320 and/or on a surface, such as an inner surface 358, of the positive electrode current collector 322. For example, lithiated zeolite particles may be coated or deposited on the inner surface 356 of the negative electrode current collector 320 to form a coating layer 360 and/or on the inner surface 358 of the positive electrode current collector 322 to form a coating layer 362.

The lithiated zeolite particles may be coated or deposited on any of these surfaces 324, 328, 356, 358 and/or sides 332, 334 by any suitable method. For example, the lithiated zeolite particles may be mixed with a binder and optionally a solvent to form a slurry, which may be spread or cast onto any of the surfaces 324, 328, 356, 358 and/or sides 332, 334. Alternatively, the lithiated zeolite-containing slurry may be co-extruded with the precursor material used to form the negative electrode 312, the positive electrode 314, and/or the separator 316. As another example, the lithiated zeolite particles may be deposited on any of the surfaces 324, 328, 356, 358 and/or sides 332, 334 using an atomic layer deposition process which allows for the formation of a thin conformal coating. In yet another example, the lithiated zeolite particles may be deposited on any of the surfaces 324, 328, 356, 358 and/or sides 332, 334 by chemical vapor deposition (CVD), chemical vapor infiltration, physical vapor deposition (PVD), electron beam evaporation, laser arc evaporation, spin coating, air spray, dip coating, layer by layer (LBL) deposition, or any other suitable process for applying such coatings to solid materials.

Figure 5:
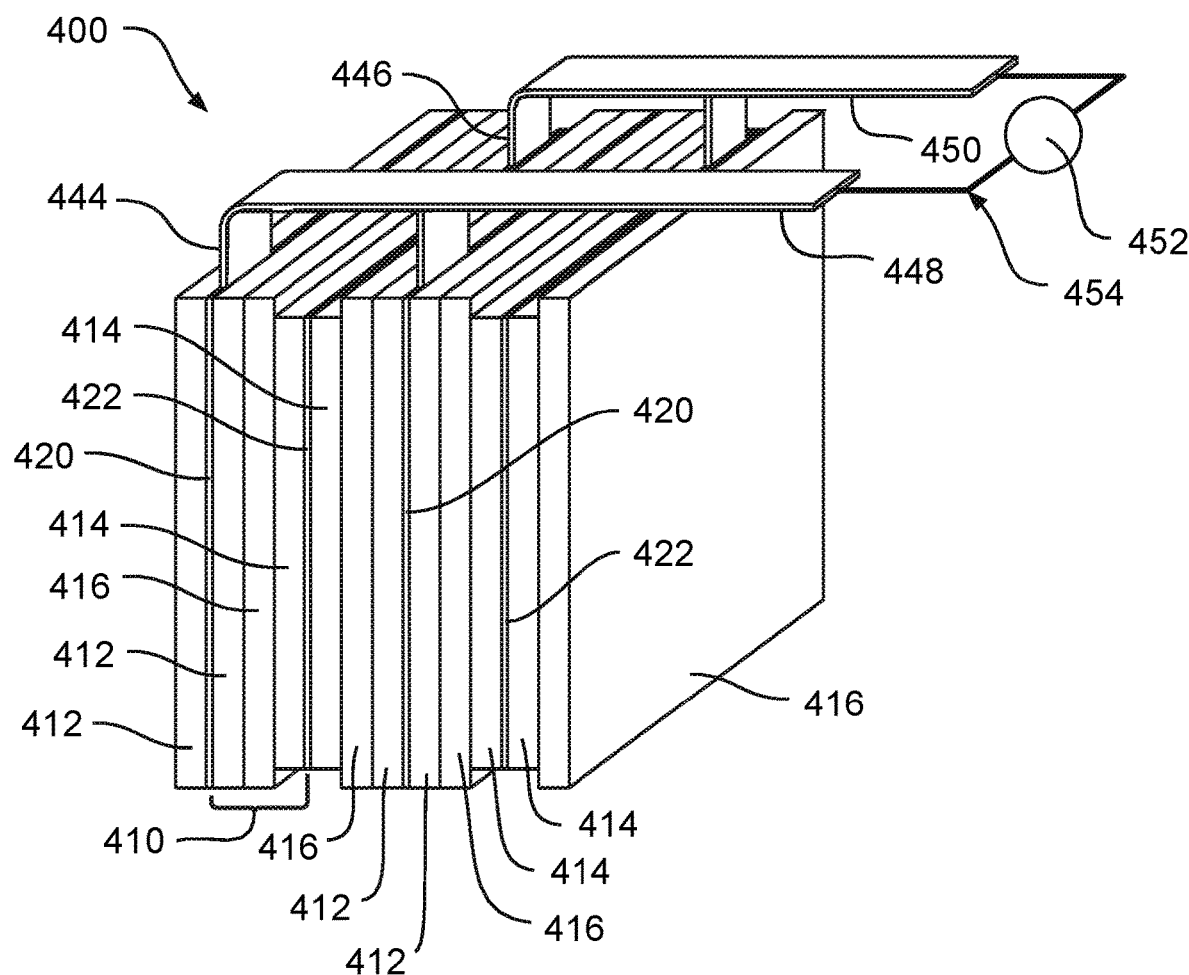
FIG. 5 is a partial perspective view of a lithium ion battery including a plurality of stacked electrochemical cells according to one aspect of the disclosure.

Referring now to FIG. 5, any of the electrochemical cells 10, 110, 210, 310 illustrated in FIGS. 1-4, or any combination or permutation thereof, may be used or combined to produce a lithium ion battery 400. The lithium ion battery 400 illustrated in FIG. 5 includes multiple rectangular-shaped electrochemical cells 410. Anywhere from 5 to 150 electrochemical cells 410 may be stacked side-by-side in a modular configuration and connected in series (although a parallel connection is also permitted) to form a lithium ion battery 400 intended for use in a vehicle powertrain. The lithium ion battery 400 can be further connected serially or in parallel to other similarly constructed lithium ion batteries to form a lithium ion battery pack that exhibits the voltage and current capacity demanded for a particular vehicle application. It should be understood the lithium ion battery 400 shown in FIG. 5 is only a schematic illustration, and is not intended to inform the relative sizes of the components of any of the electrochemical cells 410 or to limit the wide variety of structural configurations a lithium ion battery 400 may assume. Various structural modifications to the lithium ion battery 400 shown in FIG. 5 are possible despite what is explicitly illustrated.

Each electrochemical cell 410 includes a negative electrode 412, a positive electrode 414, and a separator 416 situated between the two electrodes 412, 414. Each of the negative electrode 412, the positive electrode 414, and the separator 416 is impregnated, infiltrated, or wetted with a liquid electrolyte or a gel polymer electrolyte capable of communicating lithium ions. A negative electrode current collector 420 that includes a negative polarity tab 444 is located between the negative electrodes 412 of adjacent electrochemical cells 410. Likewise, a positive electrode current collector 422 that includes a positive polarity tab 446 is located between neighboring positive electrodes 414. The negative polarity tab 444 is electrically coupled to a negative terminal 448 and the positive polarity tab 446 is electrically coupled to a positive terminal 450. An applied compressive force usually presses the current collectors 420, 422, against the electrodes 412, 414 and the electrodes 412, 414 against the separator 416 to achieve intimate interfacial contact between the several contacting components of each electrochemical cell 410.

The negative and positive terminals 448, 450 of the lithium ion battery 400 are connected to an electrical device 452 as part of an interruptible circuit 454 established between the negative electrodes 412 and the positive electrodes 414 of the many electrochemical cells 410. The electrical device 452 may comprise an electrical load or power-generating device. An electrical load is a power-consuming device that is powered fully or partially by the lithium ion battery 400. Conversely, a power-generating device is one that charges or re-powers the lithium ion battery 400 through an applied external voltage. The electrical load and the power-generating device can be the same device in some instances. For example, the electrical device 452 may be an electric motor for a hybrid electric vehicle or an extended range electric vehicle that is designed to draw an electric current from the lithium ion battery 400 during acceleration and provide a regenerative electric current to the lithium ion battery 400 during deceleration. The electrical load and the power-generating device can also be different devices. For example, the electrical load may be an electric motor for a hybrid electric vehicle or an extended range electric vehicle and the power-generating device may be an AC wall outlet, an internal combustion engine, and/or a vehicle alternator.

The lithium ion battery 400 can provide a useful electrical current to the electrical device 452 by way of the reversible electrochemical reactions that occur in the electrochemical cells 410 when the interruptible circuit 454 is closed to connect the negative terminal 448 and the positive terminal 450 at a time when the negative electrodes 412 contain a sufficient quantity of intercalated lithium (i.e., during discharge). When the negative electrodes 412 are depleted of intercalated lithium and the capacity of the electrochemical cells 410 is spent. The lithium ion battery 400 can be charged or re-powered by applying an external voltage originating from the electrical device 452 to the electrochemical cells 410 to reverse the electrochemical reactions that occurred during discharge.

Although not depicted in the drawings, the lithium ion battery 400 may include a wide range of other components. For example, the lithium ion battery 400 may include a casing, gaskets, terminal caps, and any other desirable components or materials that may be situated between or around the electrochemical cells 410 for performance related or other practical purposes. For example, the lithium ion battery 400 may be enclosed within a case (not shown). The case may comprise a metal, such as aluminum or steel, or the case may comprise a film pouch material with multiple layers of lamination. In one form, lithiated zeolite particles may be disposed on a surface of the case for the lithium ion battery 400 (not shown).

The lithiated zeolite particles incorporated in the various components of the electrochemical cells 10, 110, 210, 310, 410 illustrated in FIGS. 1-5 may comprise or consist essentially of particles of one or more dehydrated natural or synthetic zeolite materials. Zeolites are microporous crystalline aluminosilicate materials comprising a three-dimensional framework of $AlO_2$ and $SiO_2$ tetrahedral units and extra-framework cations. Each $AlO_2$ unit introduces one negative charge to the framework, which is offset by the extra-framework cations. The extra-framework cations may be organic or inorganic in nature. The presently disclosed lithiated zeolite particles may comprise a three-dimensional framework of $AlO_2$ and $SiO_2$ tetrahedral units and extra-framework lithium cations ($Li^+$). The amount of extra-framework lithium cations present in the lithiated zeolite particles will at least partially depend on the Si:Al ratio of the specific zeolite material and the cation exchange capacity (CEC) of the zeolite material. In the presently disclosed lithiated zeolite particles, lithium cations ($Li^+$) may comprise greater than 90% of the extra-framework cations in the zeolite material, greater than 95% of the extra-framework cations, or greater than 99% of the extra-framework cations. When disposed within an electrochemical cell of a lithium ion battery, prior to operation of the lithium ion battery, the lithiated zeolite particles may be substantially free of any and/or all of the following extra-framework cations: $Na^+$ and $H^+$.

Zeolite materials may be categorized based upon the crystalline structure of their corner-sharing network of tetrahedrally coordinated atoms or T-atoms (e.g., Si and Al). Zeolite structures are typically described or defined by reference to a framework type code consisting of three capital letters and assigned by the International Zeolite Association ("IZA"). A listing of all framework type codes assigned by the IZA can be found in the Atlas of Zeolite Framework Types, Sixth Revised Edition, Elsevier (2007).

In one form, the lithiated zeolite particles may comprise a dehydrated zeolite material having an Si:Al ratio in the range of 1:1 to 5:1. Some examples of low silica zeolite framework types exhibiting an Si:Al ratio in the range of 1:1 to 2:1 include: ABW, AFG, ANA, BIK, CAN, EDI, FAU, FRA, GIS, GME, JBW, LAU, LEV, LIO, LOS, LTA, LTN, NAT, PAR, PHI, ROG, SOD, WEN, THO, and TSC. Some examples of zeolite framework types exhibiting an Si:Al ratio in the range of 2:1 to 5:1 include: BHP, BOG, BRE, CAS, CHA, CHI, DAC, EAB, EMT, EPI, ERI, FAU, FER, GOO, HEU, KFI, LOV, LTA, LTL, MAZ, MEI, MER, MON, MOR, OFF, PAU, RHO, SOD, STI, and YUG. In another form, the lithiated zeolite particles may have an Si:Al ratio greater than 5:1. Some examples of high silica zeolite framework types exhibiting an Si:Al ratio greater than 5:1 include: ASV, BEA, CFI, CON, DDR, DOH, DON, ESV, EUO, FER, GON, IFR, ISV, ITE, LEV, MEL, MEP, MFI, MFS, MSO, MTF, MTN, MTT, MTW, MWW, NON, NES, RSN, RTE, RTH, RUT, SFE, SFF, SGT, SOD, STF, STT, TER, TON, VET, VNI, and VSV.

Figure 6:
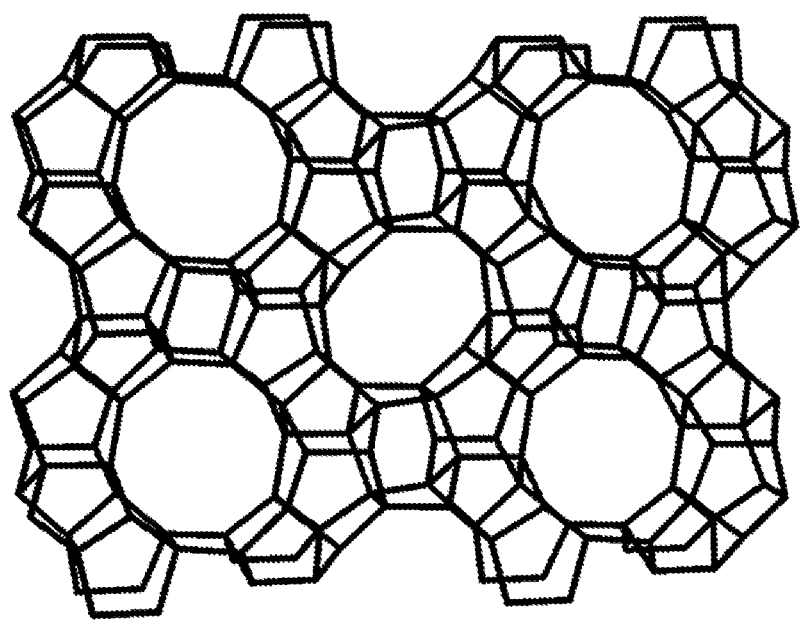
FIG. 6 a schematic illustration of the crystal structure of a dehydrated zeolite referred to as ZSM-5.

FIG. 6 illustrates the framework structure of the dehydrated form of the synthetic zeolite material referred to as ZSM-5, which is classified under framework type code MFI. Zeolite materials exhibiting the framework structure illustrated in FIG. 6 may be incorporated into one or more components of an electrochemical cell of a lithium ion battery, in accordance with one or more aspects of the present disclosure.

The lithiated zeolite particles may have a mean particle diameter in the range of 5 nm to 10 μm. The mean particle diameter of the lithiated zeolite particles may depend on the location of the particles within the various components of the electrochemical cells 10, 110, 210, 310, 410. In one form, the lithiated zeolite particles may have a mean particle diameter in the range of 100 nm to 1 μm.

The lithiated zeolite particles of the present disclosure may be prepared by a process that includes the following general steps: (1) obtaining a suitable amount of a microporous zeolite material in powder form and having exchangeable extra-framework cations, (2) contacting the zeolite material with a solution comprising at least one lithium salt dissolved in a solvent at a sufficient temperature and for a sufficient amount of time for at least some of the exchangeable extra-framework cations within the zeolite material to be replaced or exchanged with lithium ions to produce a lithiated zeolite material, (3) separating the lithiated zeolite material from the solvent, and (4) heat treating the lithiated zeolite material at a temperature greater than about 400° C. to release adsorbed water therefrom.

The microporous zeolite material may have as initial exchangeable cations one or more hydrogen-containing ions or ions of an alkali metal or an alkaline earth metal. In particular, the microporous zeolite material may have as initial exchangeable cations one or more ions of hydrogen, ammonia, lithium, sodium, potassium, rubidium, cesium, francium, beryllium, magnesium, calcium, strontium, barium, and radium. The zeolite material may be contacted by an aqueous or non-aqueous solution of a lithium salt, which may be at a temperature of greater than 50° C. during the ion-exchange process. The lithium salt may comprise lithium hydroxide, lithium carbonate, lithium chloride, lithium nitrate, lithium sulfate, or a combination thereof. The concentration of the lithium salt in the solution may be in the range of 0.1 M to 2 M and may be adjusted during the lithium ion-exchange treatment process to ensure a sufficient amount of the initial exchangeable cations in the zeolite material are replaced with lithium ions. The lithiated zeolite material may be separated from the solvent after ion exchange is complete by any suitable method, for example, by centrifuge. The lithiated zeolite material may be cleaned by removing residual ions and solvent therefrom, for example, by being washed with deionized water. Thereafter, the lithiated zeolite material may be calcined by being heated at a temperature greater than about 100° C. for a sufficient time to remove adsorbed water therefrom. The lithiated zeolite material may be calcined in a dry environment or in a vacuum to accelerate the water removal process. For example, the lithiated zeolite material may be calcined in an environment having less than 20% relative humidity, or in an environment as dry as possible. In one form, the lithiated zeolite material may be calcined by being heated at a temperature in the range of 400-600° C. for a time between 1 to 5 hours. In one specific example, the lithiated zeolite material may be calcined by being heated at a temperature of 450° C. for about 2 hours.

Atmospheric moisture may be readily absorbed by the lithiated zeolite particles after calcination. Therefore, to avoid introducing water into a lithium ion battery along with the lithiated zeolite particles, care should be taken to avoid exposing the particles to atmospheric moisture after the calcination step is complete, prior to and during assembly of the lithium ion battery. For example, prior to incorporating the lithiated zeolite particles in a lithium ion battery, the lithiated zeolite particles may be transferred from the calcination step and stored in a dry environment. If the lithiated zeolite particles are exposed to water, including atmospheric moisture, at any point prior to assembly of the lithium ion battery, an additional heat treatment step may be performed to eliminate trace water from the lithiated zeolite particles prior to incorporating the lithiated zeolite particles in a component of a lithium ion battery. The additional heat treatment step may be performed at a temperature greater than about 100° C. for a sufficient time to remove trace water from the lithiated zeolite particles.

When positioned within a lithium ion transport path through an electrochemical cell of a lithium ion battery, the lithiated zeolite particles can help prevent a phenomenon referred to as "voltage droop," reduce capacity fade and impedance, improve Coulombic efficiency, help maintain uniform current distribution along the electrode/electrolyte interface, reduce battery corrosion, and prevent outgassing of the cell.

Without intending to be bound by theory, it is believed that the lithiated zeolite particles help improve the cycle performance of lithium ion batteries, for example, by trapping trace water and scavenging hydrofluoric acid (HF). Immobilizing trace water molecules within an electrochemical cell of a lithium ion battery may help prevent decomposition of the liquid electrolyte, which in turn may help prevent decomposition of the lithium-based intercalation host material of the positive electrode. Hydrofluoric acid is highly corrosive and may be generated in an electrochemical cell of a lithium ion battery during decomposition of the electrolyte, in particular, by reaction of $LiPF_6$ with water according to the following reaction:

$$LiPF_6+H_2O \leftrightarrow LiF+POF_3+2HF \qquad (3)$$

The as-produced HF may increase the acidity of the electrolyte, which may lead to corrosion of the lithium-based intercalation host material of the positive electrode and/or the current collectors. Therefore, by functioning as an HF scavenger in an electrochemical cell of a lithium ion battery, the lithiated zeolite particles may help reduce corrosion and degradation of the various components of the battery.

Furthermore, it is believed that the lithiated zeolite particles may help improve the cycle performance of lithium ion batteries by trapping transition metal ions, such as $Mn^{2+}$ and $Fe^{2+/3+}$ ions, which may be present in the liquid electrolyte due to decomposition of the lithium-based intercalation host material of the positive electrode and/or due to the presence of transition metal impurities in the positive electrode. Also, when the lithiated zeolite particles are incorporated as a filler material in a separator of a lithium ion battery and/or coated on one or more surfaces of the separator, the lithiated zeolite particles may help improve the robustness of the battery, for example, by improving the mechanical properties and thermal stability of the separator.

EXAMPLES

Samples of a non-aqueous liquid electrolyte were prepared and used in an electrochemical cell of a lithium ion battery and the cycle performance of the as-prepared electrochemical cells was evaluated.

A synthetic zeolite material referred to as ZSM-5 was obtained in sodium form (Na-ZSM-5) and mixed with an aqueous lithium hydroxide (LiOH) solution at a temperature of about 80° C. for about 12 hours to exchange the extra-framework sodium ions (Nat) in the zeolite material with lithium ions ($Li^+$) to produce a lithiated form of ZSM-5 (Li-ZSM-5). The solid Li-ZSM-5 particles were separated from the aqueous solution by centrifuge and washed with deionized water at least 5 times. Thereafter, the Li-ZSM-5 powder was calcined at a temperature of about 450° C. for 2 hours to remove adsorbed water therefrom.

Figure 7:
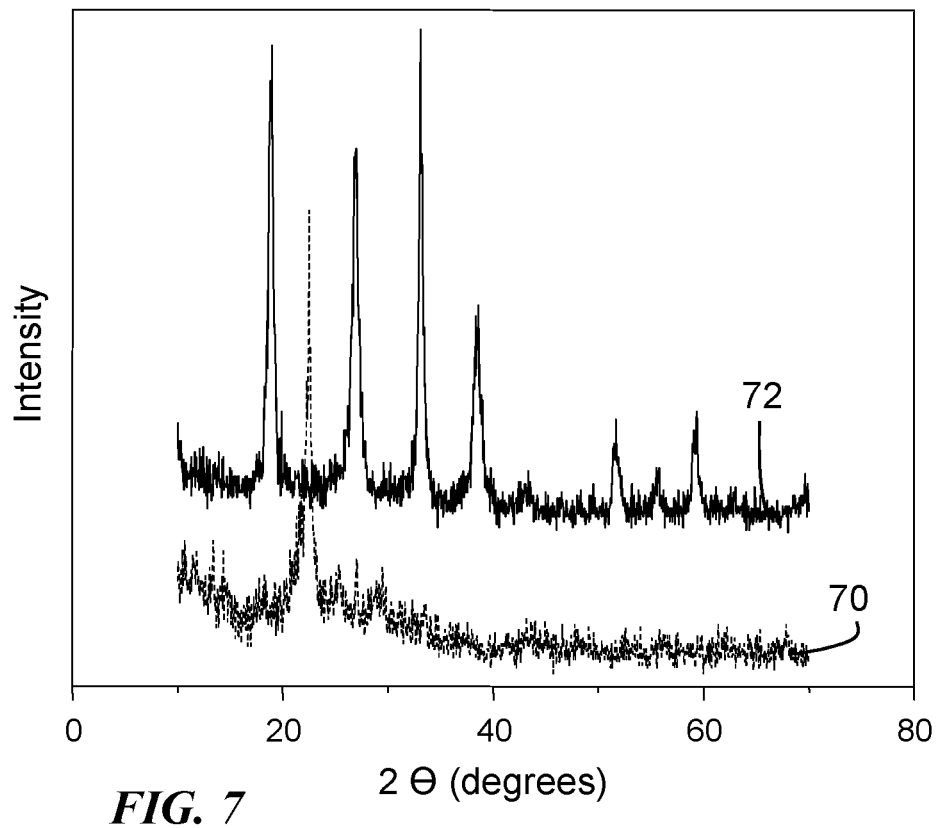
FIG. 7 depicts X-ray diffraction patterns (Intensity vs. 2Θ) of a calcined Na-ZSM-5 material (70) and a calcined Li-ZSM-5 material (72) prepared using a lithium ion-exchange treatment process according to one aspect of the disclosure.

FIG. 7 illustrates the X-ray powder diffraction patterns of a calcined Na-ZSM-5 powder (70) and the as-prepared calcined Li-ZSM-5 powder (72).

A non-aqueous liquid electrolyte solution was obtained comprising 1.0 M $LiPF_6$ in a mixture of ethylene carbonate (EC) and diethyl carbonate (DEC) at an EC:DEC ratio of 1:2 vol % ($LiPF_6$/EC/DEC).

A liquid LiZ-containing electrolyte was prepared by mixing a suitable amount of the calcined Li-ZSM-5 powder with the $LiPF_6$/EC/DEC electrolyte solution for about 2 hours to ensure uniform and complete wetting of the Li-ZSM-5 powder with the $LiPF_6$/EC/DEC electrolyte solution. The resulting LiZ-containing electrolyte comprised a suspension containing approximately 5 wt % Li-ZSM-5 powder.

An electrochemical cell for a lithium ion battery was prepared including a lithium-nickel-magnesium-cobalt oxide (NMC) positive electrode material, a graphite (G) negative electrode material, a 21 μm thick porous polymeric separator manufacturing by Celgard, and the $LiPF_6$/EC/DEC electrolyte solution. The cycle performance of this electrochemical cell (NMC/G) was evaluated under accelerated testing conditions. Specifically, this NMC/G electrochemical cell was cycled over 100 times at a temperature of about 40° C. using an initial charge rate of C/20 (using the standard C rate definition) for three cycles, followed by a charge rate of C/3 for the remaining number of cycles.

Figure 8:
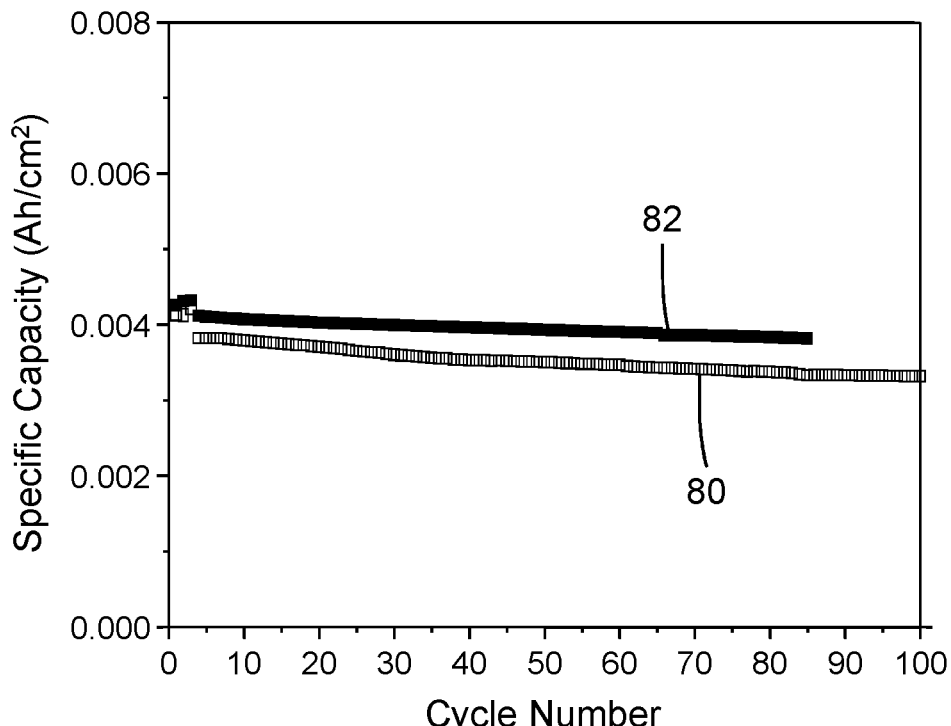
FIG. 8 is a graph of Specific Capacity (Ah/cm$^2$) vs. Cycle Number depicting the specific capacity of an electrochemical cell of a lithium ion battery including an LiPF$_6$/EC/DEC electrolyte solution (80) and an electrochemical cell of a lithium ion battery including an LiZ-containing electrolyte (82)
Figure 9:
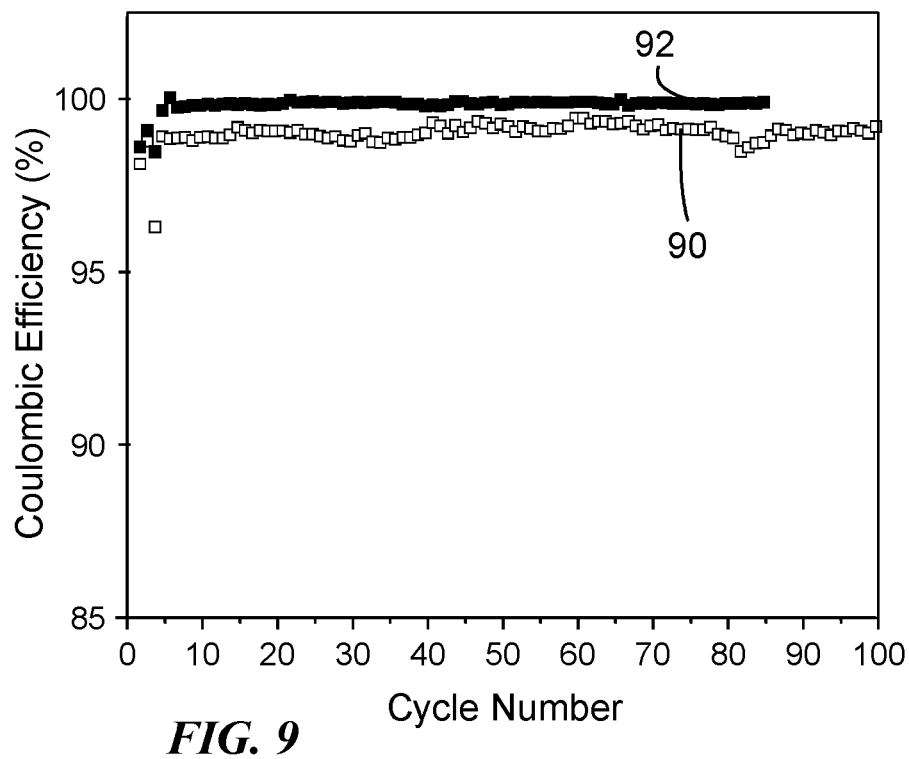
FIG. 9 is a graph of Coulombic Efficiency (%) vs. Cycle Number depicting the efficiency of an electrochemical cell of a lithium ion battery including a LiPF$_6$/EC/DEC electrolyte solution (90) and an electrochemical cell of a lithium ion battery including a LiZ-containing electrolyte (92).

As shown in FIG. 8, the specific capacity of the NMC/G electrochemical cell (80) gradually decreased as the number of cycles increased. In particular, after the first cycle the NMC/G electrochemical cell exhibited a specific capacity of about 0.0042 Ah/cm². After four (4) cycles, the NMC/G electrochemical cell exhibited a specific capacity of about 0.0039 Ah/cm², and, after 100 cycles, the NMC/G electrochemical cell exhibited a specific capacity of less than about 0.0035 Ah/cm². As shown in FIG. 9, the Coulombic efficiency of the NMC/G electrochemical cell (90) was below 99% for all cycles of the test.

A LiZ-containing electrochemical cell for a lithium ion battery was prepared including a lithium-nickel-magnesium-cobalt oxide (NMC) positive electrode material, a graphite negative electrode material, a tri-layer polypropylene-polyethylene-polypropylene (PP/PE/PP) membrane separator, and the as-prepared LiZ-containing electrolyte. The cycle performance of this LiZ-containing electrochemical cell (LiZ+NMC/G) was evaluated under the same accelerated testing conditions as that of the NMC/G electrochemical cell. Specifically, the LiZ+NMC/G electrochemical cell was cycled over 100 times at a temperature of about 40° C. using an initial charge rate of C/20 (using the standard C rate definition) for three cycles, followed by a charge rate of C/3 for the remaining number of cycles.

As shown in FIG. 8, the specific capacity of the LiZ+NMC/G electrochemical cell (82) remained relatively constant as the number of cycles increased. In particular, after the first cycle the LiZ+NMC/G electrochemical cell exhibited a specific capacity of about 0.0044 Ah/cm². After four (4) cycles, the LiZ+NMC/G electrochemical cell exhibited a specific capacity of about 0.0043 Ah/cm², and, after 100 cycles, the LiZ+NMC/G electrochemical cell continued to exhibit a specific capacity of about 0.004 Ah/cm². As shown in FIG. 9, the Coulombic efficiency of the Li+NMC/G electrochemical cell was above 99.5% for all cycles of the test.

Accordingly, the use of calcined Li-ZSM-5 powder in the electrolyte of a NMC/G electrochemical cell of a lithium ion battery can effectively reduce capacity fade and improve the Coulombic efficiency of the cell.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. An electrochemical cell for a secondary lithium ion battery comprising:
a negative electrode;
a positive electrode spaced apart from the negative electrode;
an electrolyte infiltrating the negative electrode and the positive electrode and disposed between confronting anterior surfaces of the negative electrode and the positive electrode;
a lithium ion transport path extending through the negative electrode, the positive electrode, and the electrolyte; and
lithiated zeolite particles positioned along at least a portion of the lithium ion transport path,
wherein the electrolyte comprises a liquid electrolyte solution including a lithium salt dissolved in a nonaqueous, aprotic organic solvent,
wherein at least a portion of the lithiated zeolite particles are suspended in or mixed with the liquid electrolyte solution, and
wherein the lithiated zeolite particles comprise particles of a dehydrated zeolite material exhibiting an Si:Al ratio of greater than 5:1 and having a framework type selected from the group consisting of: ASV, BEA, CFI, CON, DDR, DOH, DON, ESV, EUO, FER, GON, IFR, ISV, ITE, LEV, MEL, MEP, MFI, MFS, MSO, MTF, MTN, MTT, MTW, MWW, NON, NES, RSN, RTE, RTH, RUT, SFE, SFF, SGT, SOD, STF, STT, TER, TON, VET, VNI, and VSV, and wherein the lithiated zeolite particles are formulated to trap or inhibit movement of at least one of water molecules, hydrogen ions, hydrofluoric acid, or transition metal ions.

2. The electrochemical cell set forth in claim 1 including a porous separator disposed between the confronting anterior surfaces of the negative electrode and the positive electrode and infiltrated with the liquid electrolyte solution.

3. The electrochemical cell set forth in claim 2 wherein the porous separator comprises at least one polyolefin selected from the group consisting of polyethylene (PE), polypropylene (PP), polyamide (PA), poly(tetrafluoroethylene) (PTFE), polyvinylidine fluoride (PVdF), or poly(vinyl chloride) (PVC).

4. The electrochemical cell set forth in claim 2 wherein the porous separator includes a first side that faces toward the negative electrode and an opposite second side that faces toward the positive electrode, and wherein at least a portion of the lithiated zeolite particles are applied to the first side or the second side of the porous separator in the form of a coating layer.

5. The electrochemical cell set forth in claim 4 wherein the coating layer formed on the first side or the second side of the porous separator has a thickness of less than 5 micrometers.

6. The electrochemical cell set forth in claim 2 wherein the separator has a layered structure and comprises a first layer and a second layer adjacent the first layer, wherein the first layer and the second layer are laminated together, and wherein at least a portion of the lithiated zeolite particles are distributed along an interface between confronting surfaces of the first and second layers.

7. The electrochemical cell set forth in claim 1 wherein at least a portion of the lithiated zeolite particles are distributed throughout the negative electrode, the positive electrode, or both the negative and positive electrodes, wherein the negative electrode and the positive electrode each comprise a lithium ion intercalation host material, and wherein at least a portion of the lithiated zeolite particles are mixed with the lithium ion intercalation host material of the negative electrode, the positive electrode, or both the negative and positive electrodes.

8. The electrochemical cell set forth in claim 1 wherein at least a portion of the lithiated zeolite particles are coated in the form of a coating layer on the anterior surface of the negative electrode, on the anterior surface of the positive electrode, or on both the anterior surfaces of the negative and positive electrodes.

9. The electrochemical cell set forth in claim 1 including a negative electrode current collector adjacent the negative electrode and a positive electrode current collector adjacent the positive electrode, wherein at least a portion of the lithiated zeolite particles are coated in the form of a coating layer on a surface of the negative electrode current collector or the positive electrode current collector, or on surfaces of both the negative and positive electrode current collectors.

10. A secondary lithium ion battery including a plurality of the electrochemical cells set forth in claim 1, wherein the electrochemical cells are connected in a series or parallel arrangement.

11. The electrochemical cell set forth in claim 1 wherein the lithiated zeolite particles have a mean particle diameter in the range of 5 nanometers to 10 micrometers.

12. The electrochemical cell set forth in claim 1 wherein the lithiated zeolite particles constitute, by weight, 1% to 10% of the liquid electrolyte solution.

13. The electrochemical cell set forth in claim 1 wherein the lithium salt comprises at least one of $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, or $LiPF_6$, and wherein the nonaqueous, aprotic organic solvent comprises at least one of a cyclic carbonate, an acyclic carbonate, an aliphatic carboxylic ester, a γ-lactone, an acyclic ether, or a cyclic ether.

14. The electrochemical cell set forth in claim 1 wherein the lithiated zeolite particles comprise particles of a dehydrated zeolite material classified under framework type code MFI, and wherein the dehydrated zeolite material comprises ZSM-5.

* * * * *